(12) United States Patent
Lonoce et al.

(10) Patent No.: US 6,980,195 B2
(45) Date of Patent: Dec. 27, 2005

(54) WINDOW BRIGHTNESS ENHANCEMENT FOR LCD DISPLAY

(75) Inventors: Giovanni Lonoce, Lissone (IT); Luigi Albani, Merate (IT)

(73) Assignee: Koninklijke Philips Electronics, N.V., Eindhoven (NL)

( * ) Notice: Subject to any disclaimer, the term of this patent is extended or adjusted under 35 U.S.C. 154(b) by 334 days.

(21) Appl. No.: 10/055,396

(22) Filed: Jan. 22, 2002

(65) Prior Publication Data

US 2002/0097210 A1 Jul. 25, 2002

(30) Foreign Application Priority Data

Jan. 24, 2001 (EP) .................................. 01200261

(51) Int. Cl.⁷ .............................................. G09G 3/36
(52) U.S. Cl. ....................................... 345/102; 345/87
(58) Field of Search ........................... 345/77, 102, 204, 345/690

(56) References Cited

U.S. PATENT DOCUMENTS

| | | | |
|---|---|---|---|
| 3,873,767 A * | 3/1975 | Okada et al. ................ | 348/673 |
| 4,356,436 A * | 10/1982 | Barten et al. ................ | 315/386 |
| 5,184,117 A * | 2/1993 | Gauthier ..................... | 345/102 |
| 5,225,822 A * | 7/1993 | Shiraishi et al. ............. | 345/102 |
| 5,550,556 A | 8/1996 | Wu et al. ..................... | 345/14 |
| 5,652,600 A * | 7/1997 | Khormaei et al. ............. | 345/76 |
| 5,978,041 A | 11/1999 | Masuda et al. ............... | 348/563 |
| 6,069,449 A * | 5/2000 | Murakami .................... | 315/158 |
| 6,094,185 A | 7/2000 | Shirriff ....................... | 345/102 |
| 6,111,559 A * | 8/2000 | Motomura et al. ........... | 345/102 |
| 6,121,950 A | 9/2000 | Zavracky et al. ............. | 345/101 |
| 6,239,561 B1 * | 5/2001 | Allender ..................... | 315/387 |
| 6,345,099 B1 * | 2/2002 | Alvarez ...................... | 380/203 |
| 6,407,519 B1 * | 6/2002 | Sakurai ...................... | 315/371 |
| 6,507,156 B2 * | 1/2003 | Aitchison et al. ........... | 315/169.1 |
| 6,621,482 B2 * | 9/2003 | Fuller ........................ | 345/102 |

FOREIGN PATENT DOCUMENTS

| | | | | |
|---|---|---|---|---|
| EP | 0957631 A1 | 11/1999 | ........... | H04N 5/20 |
| JP | 54-012579 | * 1/1979 | | |
| WO | WO9920042 | 4/1999 | ........... | H04N 5/57 |

* cited by examiner

*Primary Examiner*—Ricardo Osorio
*Assistant Examiner*—Tom Sheng

(57) ABSTRACT

An LCD monitor has an LCD panel for displaying a display video signal, and a lighting unit for illuminating the LCD panel. A personal computer, for example, supplies an input video signal and a control signal indicating that the brightness of a portion of the display video signal has to be increased. The LCD unit increases the light output of the lighting unit by a predetermined amount when the control signal indicates to do so. The system further includes an amplifier to decrease an amplitude of the video signal outside the portion when the control signal indicates to do so. In this way, it is possible to increase the brightness of the portion of the displayed picture corresponding to the portion of the video signal with respect to the rest of the displayed picture.

19 Claims, 3 Drawing Sheets

WINDOW BRIGHTNESS ENHANCEMENT FOR LCD DISPLAY

The invention relates to a system for and a method of increasing the brightness of a portion of a video signal to be displayed on a Liquid Crystal Display (further referred to as LCD) monitor, to a computer, and to an LCD monitor.

EP-A-957631 discloses a system of a monitor and a computer. The computer generates display data to be displayed on the monitor, and coordinates which determine a window of the display data. If the display data in the window is video information with a relatively low bandwidth (a photograph or film), its brightness is increased to improve the visual impression. The brightness and colorimetry of the video data outside the window is kept constant. This feature provides the user with a computer monitor which displays real-life pictures like photos or video-clips substantially with the same contrast and brightness as in a TV set. The brightness of video information in other windows comprising text is not increased to prevent the readability of the text from decreasing due to a too large spot of the electron beams in the cathode ray tube. This prior art is concerned with the transfer of the coordinates of the window from the computer to the monitor.

LCDs produce a picture on the LCD-screen by controlling a transparency or reflectivity of the LCD-cells in accordance with a video signal to be displayed. A lighting system produces the light passing through or reflected by the LCD-cells. An LCD-cell becomes transparent or reflective to a smaller or larger extent, depending on the electric voltage applied across it.

In a monitor provided with a cathode ray tube, overdriving the cathode in the selected areas increases the light output on the screen of the cathode ray tube at the positions of the selected areas. However, it is very difficult to drive the lighting system of an LCD monitor to locally increase its light output at the position of an arbitrary area.

It is an object of the invention to provide a solution for increasing the light output in a selected area of matrix displays like LCDs or DMDs (deflectable mirror devices).

To this end, a first aspect of the invention provides a system for increasing the brightness of a portion of a video signal by increasing display illumination and decreasing amplitude of the video signal outside the portion. A second aspect of the invention provides a computer supplying the signals required to enable an LCD monitor to increase the brightness of a portion of a video signal. A third aspect of the invention provides an LCD monitor adapted to be able to increase the brightness of a portion of a video signal. A fourth aspect of the invention provides a method of increasing the brightness of a portion of a video signal.

The invention is based on the recognition that the brightness level which is achievable with most of the latest LCD-panels and the corresponding lighting units exceeds the real needs of the user for displaying computer pictures. Nowadays it is easy to find LCD-panels with an output brightness of more than 250 nits. Even panels with 400 nits are available on the market. However, extensive market research has proved that the typical user, when displaying computer pictures, sets the brightness at a level which is not higher than about 170 nits. The invention exploits the difference between the maximum capability of the LCD panel and the real need of the user for displaying computer pictures.

The amount of light produced by the lighting system cannot be changed dynamically across the screen as in the case of the CRT. Instead of highlighting the selected areas or window(s), the driving electronics will dim the rest of the screen (comprising synthetical pictures such as text) to, for example, 170 nits, and a control signal is sent to the monitor to increase the light output of the lighting system to, for example, its maximum brightness. As an example, an LCD panel that is able to produce 300 nits will produce an output brightness of 300 nits in the selected window(s) and 170 nits on the rest of the screen showing synthetical pictures like spreadsheets or graphics. It should be clear that all the numbers mentioned above are intended to be examples only, and may differ for different screen sizes, or for different users having different tastes.

In a system in accordance with the invention, an LCD unit, for example an LCD monitor, has an LCD device or panel for displaying a video signal, and a lighting unit for illuminating the LCD device. A signal-generating unit, for example a personal computer, supplies the video signal and a control signal indicating that the brightness of a portion of the displayed video signal has to be increased. The LCD unit increases the light output of the lighting unit by a predetermined amount when the control signal provided by the signal-generating unit indicates to do so. The system further comprises an amplitude-modifying means to decrease an amplitude of the video signal outside the portion when the control signal indicates to do so. As will become clear from further embodiments, the amplitude-modifying means may be positioned in the signal-generating unit or in the LCD unit. If the amplitude-modifying means is positioned in the signal-generating unit, the control information provided by the signal-generating unit only needs to comprise information to control the lighting unit to change the amount of light produced. If the amplitude-modifying means is positioned in the LCD unit, the control information provided by the signal-generating unit needs to comprise information to control the lighting unit to change the amount of light produced and further information to indicate when (or where on the screen) the amplitude-modifying means has to adapt the amplitude of the video signal. The portion corresponds with an area on the LCD device.

In another embodiment, the LCD unit comprises a video-processing circuit which receives an input video signal to supply a display video signal to the LCD device. The signal-generating unit comprises a video adapter (also generally referred to as graphics adapter, or video card) to supply the input video signal, and a control unit for generating the control information.

In another embodiment, the amplitude-modifying means has been adapted to decrease an amplitude of the video signal outside the portion when the control signal indicates to do so, so that the light output (and, if desired, the color attributes) of the display video signal not belonging to the portion are kept substantially constant. The portion of the display video signal whose brightness has to be increased corresponds to an area on the LCD screen. This area may be a rectangular window as produced by the operating system Windows®. The area may have any other shape. The area may even consist of background information between the characters of a text.

In another embodiment, the amplitude-modifying means comprises a controllable amplifier which controls an amplitude of the input video signal in response to the control signal.

In another embodiment, the amplitude-modifying means is present in the computer. A suitable graphics adapter is used which, for example comprises a multiplying digital-to-analog converter and a color LUT (Look-Up Table). This multiplying digital-to-analog converter may be controlled to locally decrease the amplitude of the video signal. The look-up table may be implemented in the usual way by storing values in a memory. The video signal (usually the three RGB signals) is multiplied by the factor stored in the memory. The memory is addressed in dependence on the desired correction to supply the corresponding factors. This embodiment has the advantage that the information determining the area where the amplitude of video information should be decreased need not be incorporated in the control signal provided from the computer to the monitor.

In another embodiment, again, the amplitude-modifying means is present in the computer. Now, the calculating unit, which may be a microprocessor, may adapt the data in the memory of the graphics adapter to locally decrease the amplitude of the video signal under software control.

In another embodiment, the microprocessor generates the control signal in response to a user input command. For example, the user may indicate the amount by which the light output of the lighting unit has to be increased. Alternatively, the user may indicate which predetermined area or window has to be highlighted.

In another embodiment, the computer comprises an encoder for encoding the control signal in such a way that the control signal can be efficiently transferred to the monitor. Preferably, the control signal is encoded in the video signal(s) or the synchronization signal(s). In this way, the control signal is transferred via the standard interface between the computer and the monitor. Usually, the video signals comprise the R, G and B signals. The control signal may be a signal comprising information on the amount of light to be produced by the lighting system, and information about the areas of the picture that have to be highlighted, or complementary information indicating in which areas the amplitude of the video signal has to be decreased to keep the brightness displayed substantially constant. These areas may be indicated by its coordinates. The monitor comprises a decoder to retrieve the control information to control the lighting system and the amplification factor of the controllable amplifier and/or LUT if present in the monitor.

It may be possible for the user to control the increase of the light output of the lighting system to a value which is lower than the maximum value.

The invention may be based on the same activation and communication method as described in Applicant's Ser. No. 09/602,243 which constitutes a non-prepublished patent application. As soon as application software (further referred to as LightFrame) in the computer is launched, the computer sends the coordinates of the selected window(s) that comprise(s) the picture to be enhanced to the monitor via the video cable using a proprietary protocol. In the monitor, a decoder translates this information comprising spatial coordinates, into proper information that will be used by the monitor circuitry to apply video processing only in that selected area. It is also possible to perform the video processing in the computer.

The selection of the window(s) may either be made manually by the user by clicking on the window to be selected after activating the feature, or automatically through a proper algorithm.

These and other aspects of the invention are apparent from and will be elucidated with reference to the embodiments described hereinafter.

Figure 1:
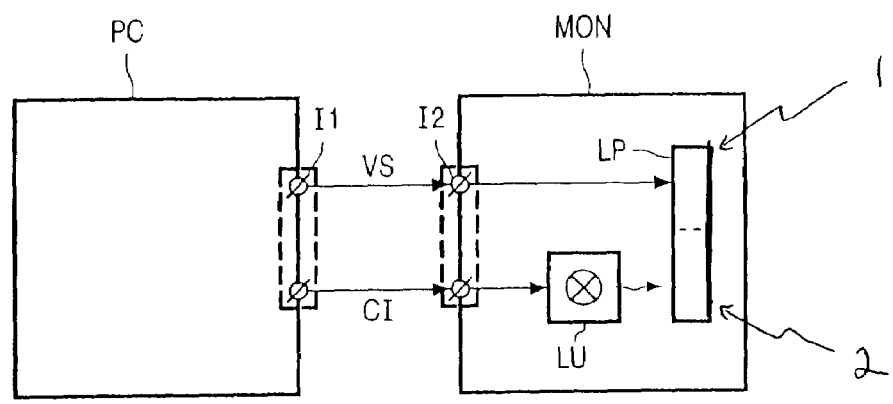
FIG. 1 shows a basic block diagram of an embodiment of a system in accordance with the invention.

A signal-generating unit PC supplies a video signal VS and control information CI to an LCD unit MON. The signal-generating unit PC may be a personal computer. The LCD unit MON, which may be a computer monitor, comprises an LCD device LP to display the video signal VS, and a lighting unit LU with a lamp to illuminate the LCD device LP. The lighting unit LU may further comprise a switched-mode power supply (not shown) to supply power to the lamp. The lighting unit LU is controlled by the control information CI to increase an amount of light produced by the lamp if a portion of the video signal VS should be displayed with a higher brightness.

The system further comprises a video amplitude-modifying means AM1;AM2;CU (see FIGS. 2, 3 and 4) to decrease an amplitude of the video signal VS outside the portion in response to the control information CI, if a portion of the video signal VS should be displayed with a higher brightness.

In this way, when the amount of light produced by the lighting unit is increased and the video amplitude of the video signal is decreased for the portion of the video signal which should not be displayed with the higher brightness, the system increases the brightness of a predetermined portion of the video signal VS.

The control of the lighting unit may be realized by changing the operating frequency of a switching inverter that powers the lamp.

In an embodiment, the amplitude-modifying means adjust the brightness of the video signal VS by digitally multiplying each video color signal R,G,B (not shown) of the video signal VS by a number ranging from 0 to 1. If the multiplication factor is 1, the brightness will be at its maximum level. If it is 0, the picture will be black. If the multiplication factor is the same for the three color signals, the color temperature of the picture is supposed to stay approximately the same and only the amount of output light (the light produced by the LCD device) is changed. In practice, it might be required to adapt the multiplication factors of the different color signals differently to keep the color temperature constant. It is also possible to change the color temperature of the picture deliberately.

The operation of the system will now be elucidated by way of example. Let it be assumed that a user is working on a spreadsheet with an output light of 170 nits. At a certain time, the user opens a window (also referred to as a first portion 1 of the display LP) showing a video clip, and an application in the computer PC (further referred to as LightFrame) is activated. In order to accomplish the brightness enhancement function in the window 1 displaying the video clip 11, as soon as LightFrame is launched, the following steps are performed at substantially the same time:

the computer PC produces the control information CI to indicate that the brightness should be increased, the lighting unit LU will increase its light output in response to the control information CI indicating to do so, for example to a level of 300 nits, the level of brightness of the video signal VS is stored temporarily in a memory, the control information CI is decoded in the LCD unit MON and the position of the window showing the video clip is identified, the three color signals related to a second portion 2 of the display LP or the area 2 outside the window 1 (in this example this is the spreadsheet) are multiplied by a factor Kr, Kg, Kb in such a way that the brightness of that area is brought to 170 nits and the color temperature is brought to the same value as before increasing the light output of the lighting unit LU.

If all the steps indicated are accomplished in a limited time period, the user will just perceive the brightness increase of the window showing the video clip.

When LightFrame is deactivated, the electronics will have to follow the reverse path, performing the following actions:

the video signals are multiplied by 1, the light output of the lighting unit LU decreases in such a way that the output brightness is at the same level as before LightFrame was activated. This brightness level is retrieved from the memory.

In this case the user will just perceive the decrease of brightness inside the window showing the video clip.

The invention is not limited to the example described above. It is possible to decrease the amplitude of the video signal VS by an amount that is smaller or larger than the amount by which the light output of the lighting unit increases. It is, however, essential that the brightness in the area to be highlighted (for example, a window showing the video clip) is higher than in another area (for example, the window showing the spreadsheet)

Figure 2:
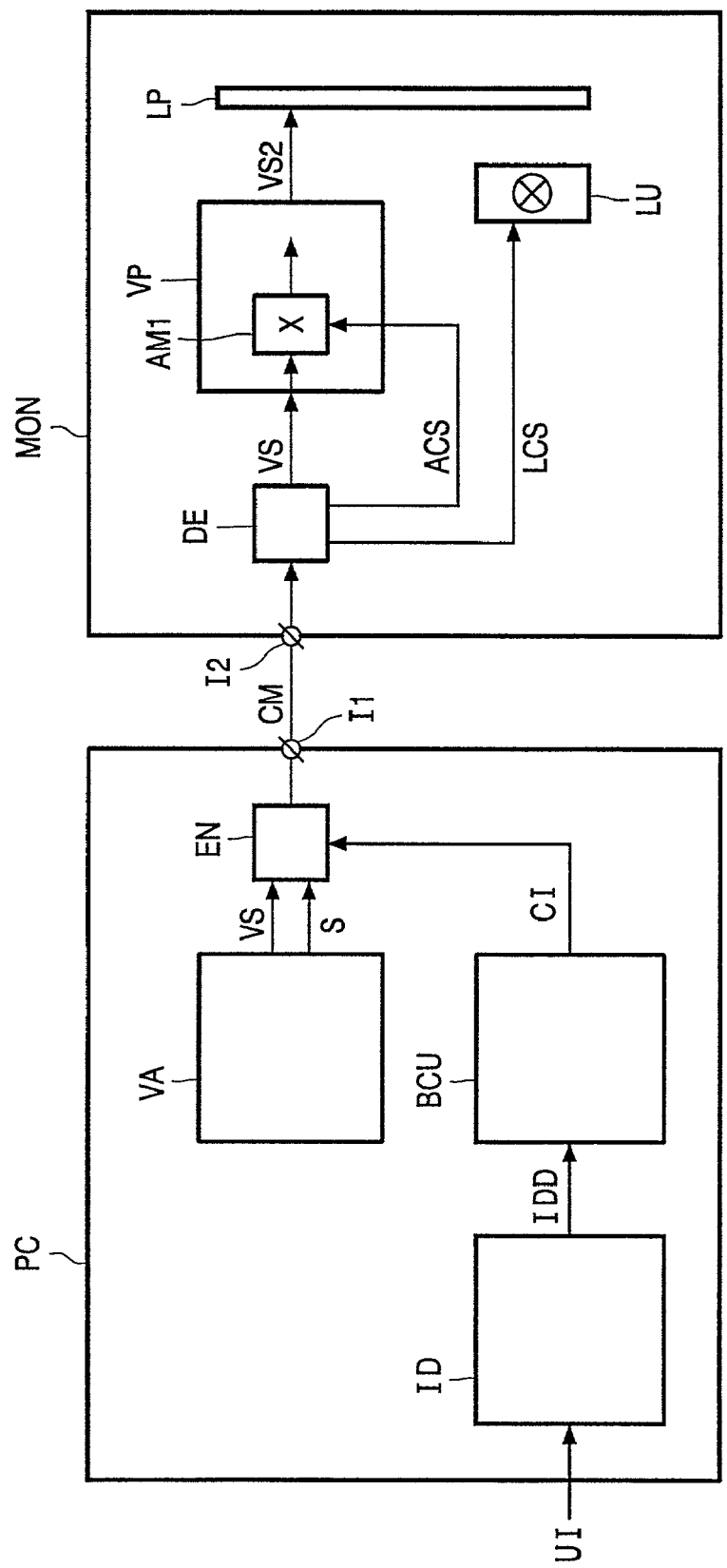

FIG. 1 shows that the video signal VS and the control information CI are separately provided at an interface I1 of the computer PC to be transported to an interface I2 of the LCD monitor. It is also possible to transport both the video signal VS and the control information CI through the same connections, as is shown in FIG. 2. Both the computer PC and the monitor MON may be separate apparatuses, and the interfaces I1 and I2 are interconnected by a cable, for example a standard VGA or DVI cable. Both the computer PC and the monitor MON may also be present in the same physical entity, while the interfaces I1 and I2 might not be actually physically present other than as a conductive connection.

FIG. 2 shows a block diagram of an embodiment of a system in accordance with the invention. In FIG. 2, the signal-generating unit PC which is a personal computer comprises a video adapter VA which supplies the input video signal VS and synchronization signals S, and a control unit BCU which generates the control information CI. The video adapter VA as such is generally known from personal computers. The control circuit BCU may be a suitably programmed microprocessor. In the embodiment of the invention as shown in FIG. 2, the computer PC further comprises an input device ID and an encoder EN. The input device ID receives user input UI to supply a user command IDD to the microprocessor in the control unit BCU. For example, the user input may be a mouse click indicating a window whose brightness should be increased, and/or an amount by which the brightness should be increased. The encoder EN encodes the control information on the video signals VS and/or the synchronization signals S to obtain a coded signal CM on the interface I1. An embodiment of a possible coding scheme as such is known from U.S. Pat. No. 5,550,556.

The LCD unit MON receives the coded signal CM on the interface I2 which is connected to the interface I1 by a standard VGA/DVI cable. The LCD unit MON comprises a decoder DE which decodes the video signal VS (usually the RGB signals) and the control information CI from the coded signal CM. The control signal CI may be decoded to obtain a first control signal ACS to control a controllable amplifier AM1, and a second control signal LCS to control a lighting unit LU. A video-processing circuit VP comprises the amplitude-modifying means AM1 which is a controllable amplifier or a LUT, as is known, for example, from a contrast control. The amplitude-modifying means AM1 receives the input video signal VS and the control signal ACS to supply a display video signal VS2 to the LCD device LP. The amplitude-modifying means AM1 controls the amplitude of the display video signal VS2 in response to the control information ACS. The LCD unit further comprises a lighting unit LU which receives the control information LCS to control the amount of light illuminating the LCD device LP. The embodiment in accordance with the invention shown in FIG. 2 operates in the same way as the embodiment in accordance with the invention shown in FIG. 1. The computer PC indicates with the control information CI that a predetermined area of the displayed picture has to be displayed with a higher brightness. Therefore, the control information CI may comprise a command LCS indicating to the lighting unit LU to increase its light output in the whole area of the displayed picture, and the information ACS about the time of occurrence or the position of the predetermined area, so that the amplitude-modifying means AM1 is correctly controlled to decrease the amplitude of the video signal VS2 outside the predetermined area and the brightness outside the predetermined area is lower than inside the predetermined area.

The information ACS may also comprise information on the amount of the light output that has to be increased. An example of the information that can be transferred in such a way that the monitor MON is able to correctly determine the area to be highlighted is described in Applicant's Ser. No. 09/602,243 which constitutes a non-prepublished patent application.

Figure 3:
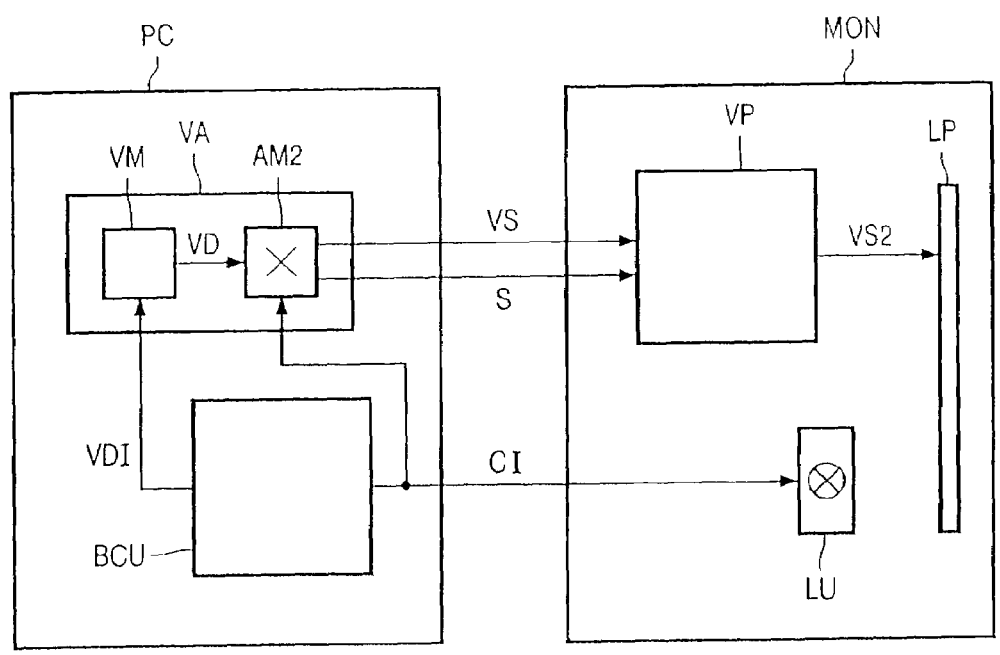
FIGS. 2 to 4 show block diagrams of embodiments of a system in accordance with the invention.

FIG. 3 shows a block diagram of an embodiment of a system in accordance with the invention. In FIG. 3, the signal-generating unit PC which is a personal computer comprises a video adapter VA which supplies the input video signal VS and synchronization signals S, and a control unit BCU which generates the control information CI. The video adapter VA comprises a video memory VM and the amplitude-modifying means, which is a controllable amplifier AM2. The control circuit BCU may be a suitably programmed microprocessor. The microprocessor writes (or commands to write) the video information VDI in the usual way into the video memory VM. The amplitude of the video information VD read from the video memory VM is controlled by the controllable amplifier AM2 under the control of the control signal CI. The controllable amplifier AM2 controls the amplitude of the video signal VS in response to the control information CI. The video information VD may be digital data, and the controllable amplifier AM2 may be a digital multiplier or a LUT. The video information VD may be an analog signal, and the controllable amplifier AM2 may be an analog multiplier as known from a contrast control.

The LCD unit MON receives the video signal VS (usually the RGB signals) and the control information CI from the computer PC. A video-processing circuit VP receives the input video signal VS to supply a display video signal VS2 to the LCD device LP. The LCD unit further comprises a lighting unit LU which receives the control information CI to control the amount of light illuminating the LCD device LP. The embodiment in accordance with the invention shown in FIG. 3 operates in the same way as the embodiment in accordance with the invention shown in FIG. 2. The computer PC indicates with the control information CI that a predetermined area of the displayed picture has to be displayed with a higher brightness. Therefore, the control information CI may comprise a command indicating to the lighting unit LU to increase its light output, and information about the time of occurrence or the position of the predetermined area and the amount the amplitude should be decreased, so that the controllable amplifier AM2 is correctly controlled to decrease the amplitude of the video signal VS outside the predetermined area by the correct amount. It is possible to split the control information into two separate control signals: a first control signal indicating to the controllable amplifier AM2 when to decrease the amplitude of the video signal VS, and a second control signal indicating to the lighting unit LU to increase its light output. Now, the communication channel between the monitor MON and the computer PC should be a two-way channel. The amount of light the user was using before activation of LightFrame has to be communicated from the monitor to the computer PC in order to adjust the surrounding area to the same level. Such a communication is possible through the USB bus.

Figure 4:
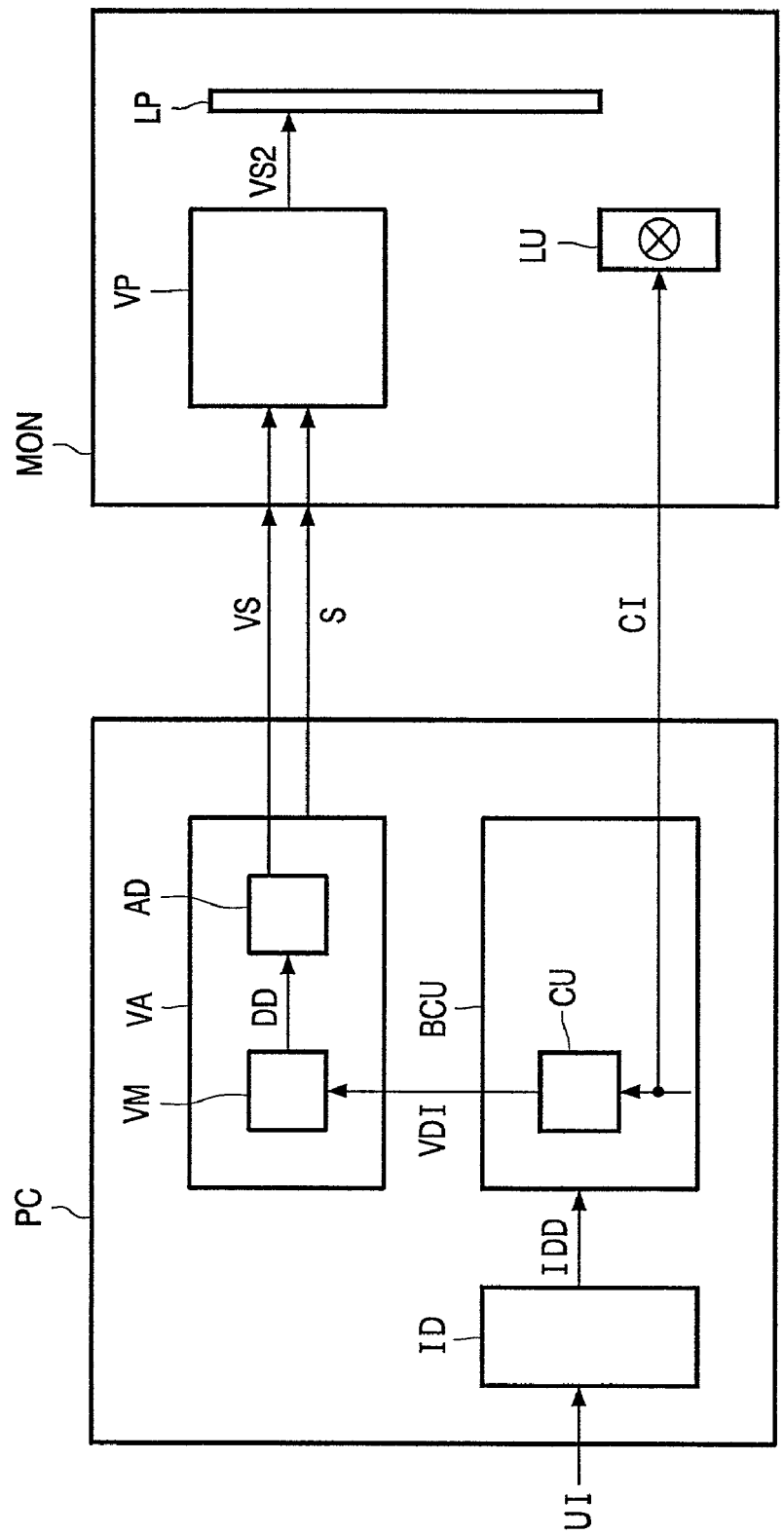

FIG. 4 shows a block diagram of an embodiment of a system in accordance with the invention. In FIG. 4, the signal-generating unit PC which is a personal computer comprises a video adapter VA which supplies the input video signal VS and synchronization signals S, and a control unit BCU which generates the control information CI. The control unit comprises a calculating unit CU which may be a suitably programmed microprocessor. The video adapter VA comprises a video memory VM and an analog-to-digital converter AD. The amplitude-modifying means is realized by modifying the video data VDI written into the memory VM with the calculating unit CU. For example, when the amplitude of the video signal outside the area where the brightness has to be increased has to be lowered by a factor 0.7, all of the data in the memory is recalculated to 0.7 times its original value. If required, the digital data DD read from the video memory VM is converted into an analog video signal VS. The video adapter VA further provides a synchronization signal S in a usual way.

The computer PC may further comprise an input device ID which receives user input UI to supply a user command IDD to the microprocessor in the control unit BCU. For example, the user input may be a mouse click indicating a window whose brightness should be increased, and/or an amount by which the brightness should be increased.

The LCD unit MON is identical to the LCD unit described with respect to FIG. 3, and is therefore not described again. In this situation, the bi-directional communication between monitor and PC is also required.

The embodiment in accordance with the invention shown in FIG. 4 operates in the same way as the embodiment in accordance with the invention shown in FIG. 3. The computer PC indicates with the control information CI that a predetermined area of the displayed picture has to be displayed with a higher brightness. Therefore, the control information CI may comprise a command indicating to the lighting unit LU to increase its light output, and information about the time of occurrence or the position of the predetermined area, so that the control unit CU is able to recalculate the correct data with the correct factor and to decrease the amplitude of the video signal VS outside the predetermined area. It is possible to split the control information into two separate control signals: a first control signal indicating to the control unit CU when to decrease the amplitude of the video signal VS by which amount, and a second control signal indicating to the lighting unit LU to increase its light output.

It should be noted that the above-mentioned embodiments illustrate rather than limit the invention, and that those skilled in the art will be able to design many alternative embodiments without departing from the scope of the appended claim. In the claims, any reference signs placed between parentheses shall not be construed as limiting the claim. Use of the verb "to comprise" and its conjugations does not exclude the presence of elements or steps other than those stated in a claim. The invention can be implemented by means of hardware comprising several distinct elements, and by means of a suitably programmed computer. In a device claim enumerating several means, several of these means may be embodied by one and the same item of hardware.

What is claimed is:

1. A system for increasing the brightness of a first portion over a second portion of a liquid crystal display (LCD) device for displaying a video signal, the system comprising:
    a signal-generating unit for supplying the video signal and control information, and
    a lighting unit for increasing an amount of light illuminating the first and second portions of the LCD device in response to the control information, and
    video amplitude-modifying means for decreasing an amplitude of the video signal displayed on the second portion of the LCD device in response to the control information.

2. A system as claimed in claim 1, further comprising:
    an LCD unit having the LCD device, the LCD unit comprising a video-processing circuit for receiving the video signal to supply a display video signal to the LCD device,
    the signal-generating unit comprising:
    a video adapter for supplying the video signal, and
    a control unit for generating the control information.

3. A system as claimed in claim 2, wherein the amplitude-modifying means is adapted to decrease the amplitude of the display video signal displayed on the second portion of the LCD device so that the light output and colorimetry of the display video signal displayed on the second portion of the LCD device is kept substantially constant.

4. A system as claimed in claim 3, wherein the amplitude-modifying means is adapted to decrease the amplitude of the display video signal displayed on the second portion of the LCD device so that also a color of the display video signal displayed on the second portion of the LCD device is kept substantially constant.

5. A system as claimed in claim 2, wherein the signal-generating unit comprises an encoder for supplying the control information as a coded message, and the LCD unit comprises a decoder for decoding the message to obtain a control signal supplied to the lighting unit to increase its light output.

6. A system as claimed in claim 5, wherein the encoder comprises a video encoder for coding the coded message in the video or synchronizing signal.

7. A system as claimed in claim 5, wherein the coded message indicates an amount by which the light output of the lighting unit has to be increased.

8. A system as claimed in claim 2, wherein the amplitude-modifying means comprise a controllable amplifier for receiving the video signal to control an amplitude of the video signal in response to the control information.

9. A system as claimed in claim 2, wherein the amplitude-modifying means comprise a memory in which a look-up table is stored for use in changing an amplitude of the video signal in response to the control information.

10. A system as claimed in claim 2, wherein the video adapter comprises the amplitude-modifying means for receiving video data from the video adapter to control an amplitude of the video data in response to the control information to obtain a first amplitude for the video signal displayed on the second portion of the LCD device, wherein the first amplitude is smaller than a second amplitude of the video signal displayed on the first portion of the LCD device.

11. A system for increasing the brightness of a first portion over a second portion of an LCD device for displaying a video signal, the system comprising:
  a signal-generating unit having a video adapter for supplying the video signal and having a control unit for generating control information;
  a lighting unit for increasing an amount of light illuminating the first and second portions of the LCD device in response to the control information; and
  video amplitude-modifying means for decreasing an amplitude of the video signal displayed on the second portion of the LCD device in response to the control information, wherein the video adapter comprises a video memory, and the control unit comprises a calculating unit suitably programmed to write adapted video data into the video memory to obtain the video signal displayed on the second portion of the LCD device with an amplitude which is smaller than an amplitude of the video signal displayed on the first portion.

12. A system for increasing the brightness of a first portion over a second portion of an LCD device for displaying a video signal, the system comprising:
  a signal-generating unit having a video adapter for supplying the video signal and having a control unit for generating control information;
  a lighting unit for increasing an amount of light illuminating the first and second portions of the LCD device in response to the control information; and
  video amplitude-modifying means for decreasing an amplitude of the video signal displayed on the second portion of the LCD device in response to the control information, wherein the signal-generating unit further comprises an input device for receiving user input, the control unit being suitably programmed to generate the control information in response to the user input indicating a predetermined amount by which the light output of the lighting unit has to be increased.

13. A computer comprising:
  an interface for connecting an LCD unit,
  a video adapter for supplying a video signal to the interface for display on a first portion and a second portion of the LCD unit,
  a brightness control unit for supplying control information to the interface, the control information indicating to a lighting unit of the LCD unit that an increase of its light output of said first and second portions is requested, and
  the control information indicating to a video amplitude-modifying means that a decrease in an amplitude of the video signal displayed on a second portion of the LCD unit so that said first portion is brighter than said second portion is requested.

14. An LCD monitor comprising:
  an interface for receiving a video signal and control information from a computer,
  an LCD device for displaying the video signal, said control information including data for increasing brightness of a first part over a second part of the LCD device,
  a lighting unit for receiving the control information to increase an amount of light illuminating the first and second parts of the LCD device, and
  a video amplitude-modifying means for decreasing an amplitude of the video signal displayed on the second part of the LCD device so that the first part of the LCD device is brighter than the second part.

15. A method of increasing the brightness of a first portion over a second portion of an LCD device for displaying a video signal, the method comprising:
  supplying the video signal and control information,
  displaying the video signal on an LCD device, increasing an amount of light illuminating the first and second portions of the LCD device in response to the control information,
  decreasing an amplitude of the video signal displayed on the second portion of the LCD device in response to the control information.

16. A method of increasing brightness of a first portion relative to a second portion of a display comprising:
  providing illumination to illuminate said display;
  providing a video signal for display on said display;
  increasing said illumination; over said first portion and said second portion and
  decreasing an amplitude of said video signal displayed on said second portion.

17. A display comprising:
  an illuminator configured to provide illumination to illuminate said display;
  a generator configured to provide a video signal for display on said display; and
  a controller configured to increase brightness of a portion of said display by increasing said illumination provided by said illuminator and decreasing an amplitude of said video signal displayed outside said portion of said display.

18. A display device comprising a controller configured to increase illumination of said display device, and to decrease an amplitude of a video signal displayed on an area outside a portion of said display device so that a brightness of said portion is greater than a brightness of said area.

19. A display device comprising brightness means for increasing brightness of a first part over a second part of the display device, said brightness means including:
  means for providing illumination to illuminate said first part and said second part of said display;
  means for providing a video signal for display on at least said second part of said display;
  means for increasing said illumination; over said first part and said second part and
  means for decreasing an amplitude of said video signal displayed on said second part of said display device so that said first part is brighter than said second part.

* * * * *